US006531844B1

(12) United States Patent
Tate, Jr.

(10) Patent No.: US 6,531,844 B1
(45) Date of Patent: Mar. 11, 2003

(54) POWER SOURCE WITH EVAPORATIVE EMISSION RECOVERY

(75) Inventor: Edward Dean Tate, Jr., Grand Blanc, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/058,628

(22) Filed: Jan. 28, 2002

(51) Int. Cl.[7] .................. H01M 10/44; H01M 10/46
(52) U.S. Cl. ........................... 320/101; 123/518
(58) Field of Search .................. 320/101, 103, 320/104; 123/518, 570, 520

(56) References Cited

U.S. PATENT DOCUMENTS 3,792,293 A * 2/1974 Marks
5,366,151 A * 11/1994 King et al.

* cited by examiner

Primary Examiner—Edward H. Tso
(74) Attorney, Agent, or Firm—Christopher DeVries

(57) ABSTRACT

A purge control system for an electric vehicle including a fuel tank, a purge canister coupled to the fuel tank, an internal combustion engine coupled to the purge canister, a microgenerator coupled to the purge canister, and where said microgenerator uses fuel in the purge canister to generate electrical energy.

14 Claims, 2 Drawing Sheets

POWER SOURCE WITH EVAPORATIVE EMISSION RECOVERY

TECHNICAL FIELD

The present invention relates generally to the recovery of evaporative emissions for a vehicle. More specifically, the present invention relates to a method and apparatus including a microgenerator or an array of microgenerators to recover evaporative emissions from vehicle fuel tank to generate power.

BACKGROUND OF THE INVENTION

In today's automotive market, vehicles are typically equipped with a fuel evaporation control system to eliminate evaporative emissions from a fuel tank to the environment. The evaporative emissions are collected in a purge canister such as a charcoal canister where carbon granules store the vapor when the engine in the vehicle is turned off. After the engine has been started, the canister will be regenerated and the vapors will enter the engine to be used in normal operation. If a vehicle is left unused for an extended period of time, the canister may saturate with fuel, and vapors may be released into the atmosphere. An extended period of disuse of the vehicle will also affect the electrical system, specifically the battery. Parasitic currents are drawn from the battery when the vehicle is off to maintain memory in various electronic devices, through the polling of wireless communication services, and the battery is also naturally discharging through internal battery parasitic currents. The battery after this extended period of disuse may expend all of its electrical energy and fail to start the vehicle when desired by an operator.

SUMMARY OF THE INVENTION

The present invention includes a method and apparatus that uses a microgenerator or array of microgenerators to utilize fuel stored in a canister supplemented by fuel from the vehicles fuel system to charge the battery in a vehicle. During extended periods of vehicle disuse, this will prevent the canister from being saturated and the battery from discharging. Formerly wasted fuel vapors discharged to the atmosphere are now used to charge the battery.

A microgenerator comprises a gas turbine supplied with fuel and air that rotates a generator to produce electrical power. The microgenerator may further include AC/DC and DC/AC converters to condition the power as needed. The microgenerator will have dimensions of substantially under one inch in area and one-tenth of an inch in volume, but any other dimensions are within the scope of the present invention including larger and smaller dimensions. Microgenerators may be arrayed in series or parallel, depending on the required voltage and current outputs. Alternatively, a microgenerator may consist of a fuel cell supplied with fuel and air.

The present invention further includes a method and apparatus to determine the state of charge (SOC) of a battery in a vehicle. The SOC is defined as the percentage of the full capacity of a battery that is still available for further discharge. The SOC determination is used by the microgenerator(s) to regulate the charging of the battery.

DESCRIPTION OF THE PREFERRED EMBODIMENT

Figure 1:
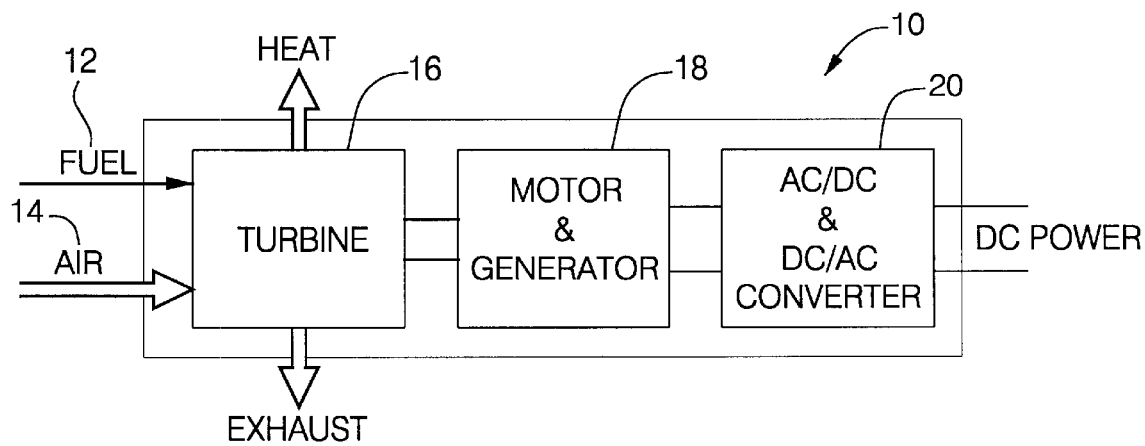
FIG. 1 is a diagrammatic drawing of a microgenerator of the present invention.

FIG. 1 is a diagrammatic drawing of a microgenerator 10 used in the present invention. Fuel 12 and air 14 enter a gas turbine 16. The gas turbine 16 rotates a motor/generator (MOGEN) 18 to generate electricity. The MOGEN 18 may comprise any known type of generator including, but not limited to, electrostatic, induction and permanent magnet generators. The electrical current output of the MOGEN 18 is rectified and conditioned by a converter 20 to provide regulated DC power. In the preferred embodiment of the present invention, the converter 20 comprises a series of rectifier diodes.

Figure 2:
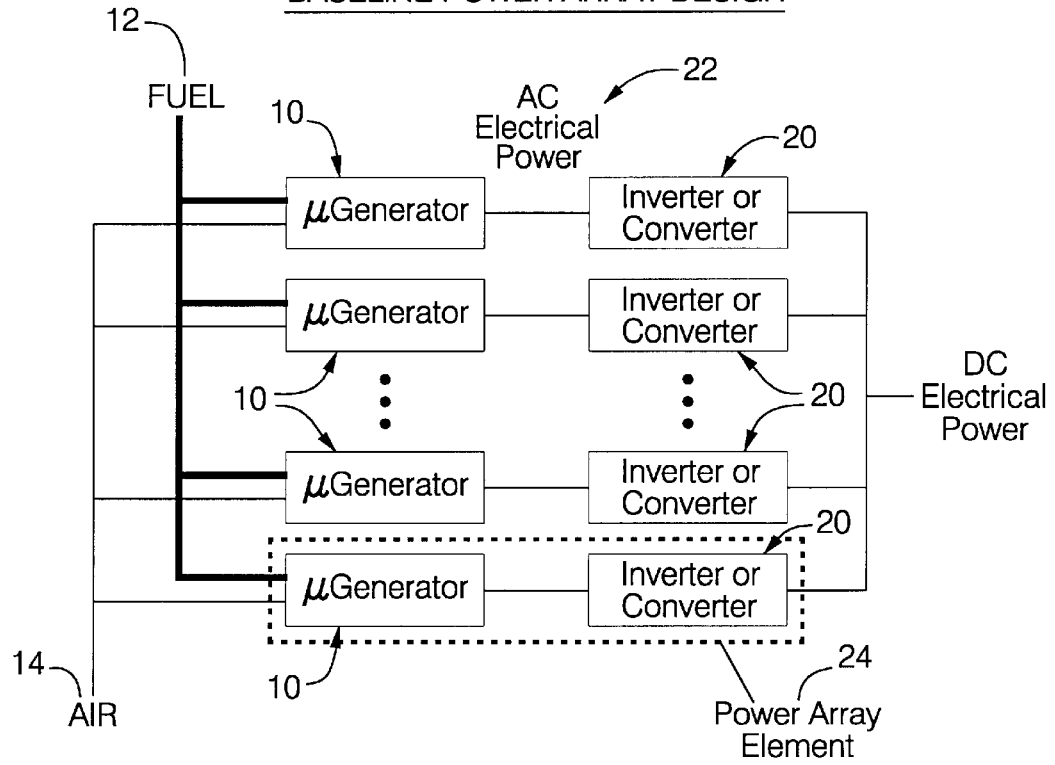
FIG. 2 is a diagrammatic drawing of an array of microgenerators of the present invention.

FIG. 2 is a diagrammatic drawing of an array 22 of microgenerators 10 of the present invention. The array 22 is configured to produce desired voltage and current outputs. Voltage and current are controlled by controlling the rate of fuel feed into the microgenerator(s) 10.

Figure 3:
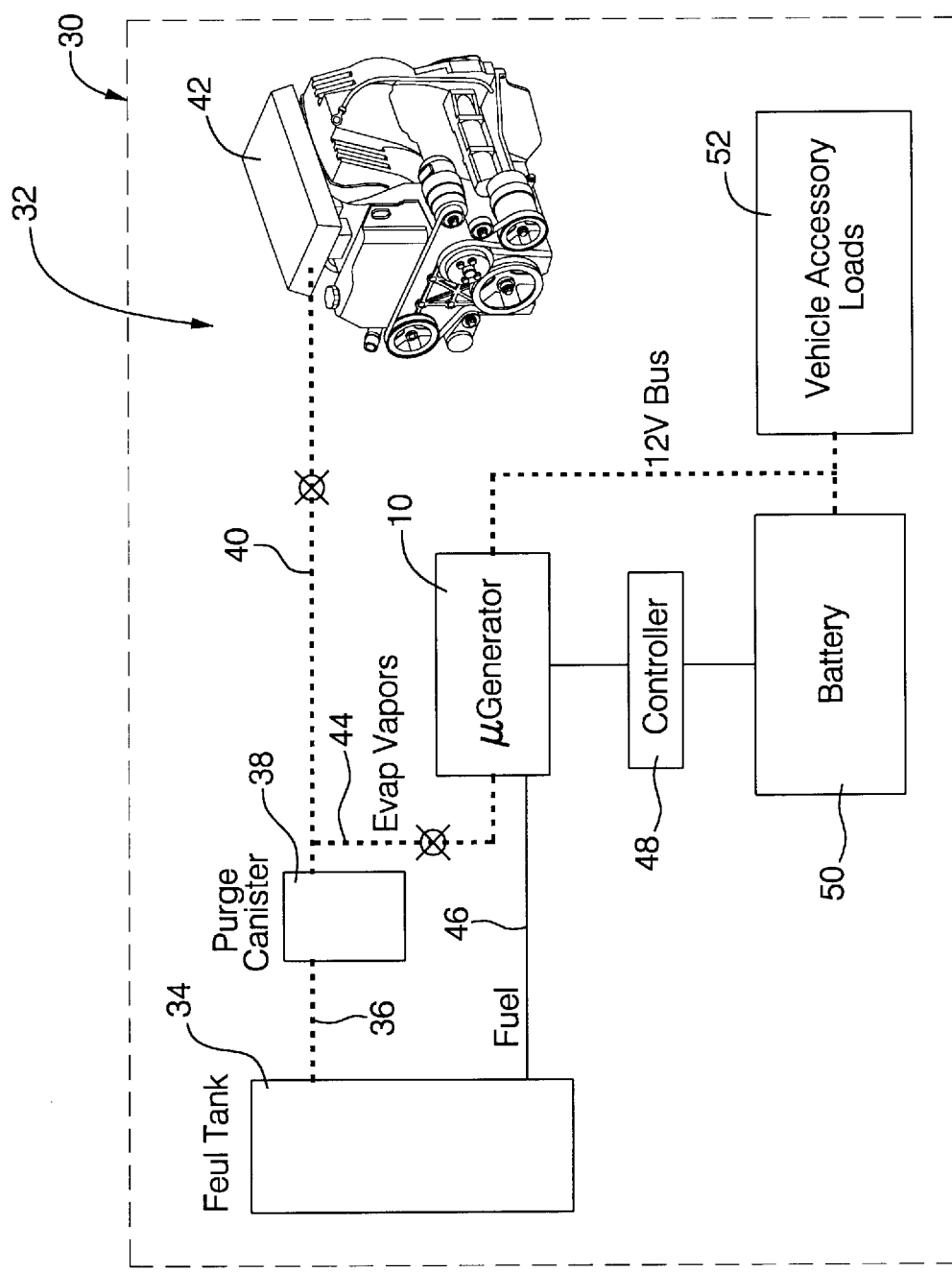
FIG. 3 is a diagrammatic drawing of the fuel control system of the present invention.

FIG. 3 is a diagrammatic drawing of a vehicle 30 containing a fuel control system 32 of the present invention. The fuel control system 32 includes a fuel tank 34 used to hold fuel such as gasoline or diesel fuel. A purge line 36 is connected to the fuel tank 34 and a purge canister 38. The purge canister includes carbon to absorb fuel vapor when the vehicle 30 is in an off state. The purge canister 38 is coupled to an internal combustion engine 42 by a purge line 40. During operation of the engine 42, the vacuum created by the engine draws air through the purge canister 38 and purge line 40 to pull fuel vapor into the engine 42, regenerating the purge canister 38 and burning the fuel vapor in the engine 42.

The present invention further includes a purge line 44 to the microgenerator 10. The microgenerator 10 is further coupled to the fuel tank 34 by fuel line 46. In the preferred embodiment of the present invention, a controller 48 controls the microgenerator operation in response to the operating condition of the vehicle 30. If the controller 48 determines that the vehicle 30 has been in an extended period of disuse and the purge canister 38 is saturated, the microgenerator 10 will be operated by the fuel vapors in the purge canister 38 supplemented by fuel from the main tank to generate power to charge the battery 50. Vapor is drawn from the purge canister 38 by applying a vacuum to across a control valve. The vacuum causes air to be drawn into the purge canister 38 to draw the vapors from storage in the purge canister 38. The power generated by the microgenerator 10 in the preferred embodiment will be used to charge a battery 50. The battery 50 is preferably charged at substantially 12 to 14 volts by the microgenerator 10. The battery 50 SOC is monitored by the controller 48. In alternate embodiments of the present invention, the microgenerator 10 will power vehicle accessory loads 52 directly. Vehicle accessory loads 52 include, but are not limited to, clocks, electronic controllers, vehicle electronics, and sensors. In this manner the purge canister 38 may be regenerated before fuel vapor is released to the environment and the battery 50 may be recharged before it is fully discharged by the accessory loads 52.

While this invention has been described in terms of some specific embodiments, it will be appreciated that other forms can readily be adapted by one skilled in the art. Accordingly, the scope of this invention is to be considered limited only by the following claims.

What is claimed is:

1. A purge control system for an electric vehicle comprising:
   a fuel tank;
   a purge canister coupled to said fuel tank;
   an internal combustion engine coupled to said purge canister;
   a generator coupled to said purge canister; and
   wherein said generator uses fuel in said purge canister to generate electrical energy.

2. The purge control system of claim 1 further comprising a battery coupled to said generator, wherein said generator charges said battery.

3. The purge control system of claim 2 further comprising vehicle accessory loads coupled to said battery.

4. The purge control system of claim 1 further comprising an array of generators.

5. The purge control system of claim 1 further comprising a controller to monitor said purge canister and control said generator.

6. The purge control system of claim 1 wherein said generator comprises a microgenerator having a gas turbine, a motor-generator, and a power converter.

7. The purge control system of claim 1 wherein said generator comprises a fuel cell.

8. The purge control system of claim 1 wherein said generator has a volume of less than 12 cubic inches.

9. A method of charging a battery comprising:
   absorbing fuel vapor from a fuel tank in a purge canister;
   powering a microgenerator with the fuel vapor, the microgenerator generating electricity; and
   charging the battery with said generated electricity.

10. The method of claim 9 further comprising the step of controlling said microgenerator to provide a desired voltage level.

11. The method of claim 9 further comprising the step of monitoring the state of charge of the battery.

12. A method of purging a fuel evaporation control system comprising the steps of:
    providing a fuel tank;
    providing a purge canister;
    providing a microgenerator;
    absorbing evaporated fuel from the fuel tank with purge canister;
    venting said purge canister to provide fuel vapor to said microgenerator; and
    generating electricity with said microgenerator.

13. The method of claim 12 further comprising the step of charging a battery with said generated electricity.

14. The method of claim 13 further comprising the step of monitoring the state of charge of the battery.

* * * * *